3,822,301
2-(5-NITROFURYLVINYL - 4 - METHYL-5-ACETYL-THIAZOLE DERIVATIVES AND ANTIMICROBIAL AGENTS CONTAINING SAME
Saburo Ueno, Takao Kawasaki, Daisaku Inmaru, Yoshiaki Ohsaka, Kouji Satomi, Akio Sasaki, and Osamu Ohtake, Tokyo, Japan, assignors to Kureha Kagaku Kogyo Kabushiki Kaisha, Tokyo, Japan
No Drawing. Filed Apr. 27, 1972, Ser. No. 248,120
Claims priority, application Japan, May 4, 1971, 46/29,545, 46/29,546, 46/29,547
Int. Cl. C07d 5/30
U.S. Cl. 260—240 A    7 Claims

ABSTRACT OF THE DISCLOSURE 2-(5-nitrofurylvinyl) - 4 - methyl - 5 - acetylthiazole derivatives are prepared by reacting 2-(5-nitrofurylvinyl)-4-methyl-5-acetylthiazole with a hydroxylamine, a semicarbazide, a thiosemicarbazide or an acid addition salt of aminoguanidine. An oxime acetate derivative is prepared directly from 5-nitrofurfural or its diacetate by reacting it with 2,4-dimethyl-5-acetylthiazole oxime in the presence of acetic anhydride.

BACKGROUND OF THE INVENTION

This invention relates to new nitrofuran derivatives and to antimicrobial agents comprising same. More particularly, this invention relates to 2-(5-nitrofurylvinyl)-4-methyl-5-acetylthiazole derivatives and to antimicrobial agents comprising one or more of these derivatives. This invention also relates to the use of such antimicrobial agents for chemotherapy and for preservation of food and drink as well as animal feed.

A variety of nitrofuran derivatives has been proposed for use as agents for inhibiting the growth of microorganisms. The known nitrofuran derivatives possess excellent antimicrobial activity as demonstrated by tests in vitro. However, they tend to lose their antimicrobial activity when used in combination with mercapto compounds or proteinaceous material. For example, when 1 molar portion of Nitrofurazone is heated together with 10 molar portions of cystein and $\frac{1}{10}$ molar portion of $FeSO_4$, antimicrobial agent to Bacillus subtilis is decreased to $\frac{1}{10}$ of the original level. When 1 molar portion of 5-nitrofurylacrylamide is heated together with 10 molar portions of cystein and $\frac{1}{2}$ molar portion of $FeSO_4$, antimicrobial activity falls to $\frac{1}{20}$ of the original level.

The 2-(5-nitrofurylvinyl)-4-alkyl-5-substituted thiazole derivatives which have recently been developed and disclosed in the art may be represented by the general formula:

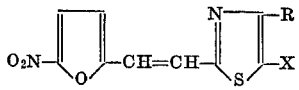

wherein R is an alkyl radical and X is an acetyl, nitro or carboxyl radical. The above prior art nitrofuran derivatives exhibit selective antimicrobial activity and have proven useful in a wide variety of fields as antimicrobial agents. However, they also tend to lose their antimicrobial activity when used in combination with mercapto compounds or proteinaceous material. Such deactivating substances are frequently present in the environment where antimicrobial agents are utilized. Accordingly, the effectiveness in the practical application of these antimicrobial agents can be expected to be less than that shown in test in vitro. Thus, there exist in the art the need for a new type of antimicrobial agent having the capability of resisting any reduction of antimicrobial activity due to the presence of mercapto compound or proteinaceous materials.

SUMMARY OF THE INVENTION

It has now been discovered that certain 2-(5-nitrofurylvinyl)-4-methyl-5-acetylthiazole derivatives possess the requisite antimicrobial activity in combination with good light stability, high solubility and resistance to the neutralizing effect of mercapto compounds or proteinaceous materials.

The new 2-(5-nitrofurylvinyl)-4-methyl-5-acetylthiazole derivatives of this invention are represented by the general formula:

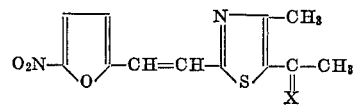

wherein X stands for NOH, N—OCOCH$_3$,

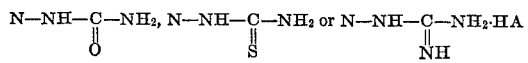

wherein A is an anion of the acid HA. Examples of anion A include halogen and sulfateanions.

These 2-(5-nitrofurylvinyl) - 4 - methyl-5-acetylthiazole derivatives have strong antimicrobial activity and low toxicity in warm-blooded animals. These antimicrobial agents are useful in a wide variety of applications, especially as chemotherapeutic agents and as preservatives for food and drink.

DESCRIPTION OF THE PREFERRED EMBODIMENTS

The compounds of the present invention are prepared by reacting 2-(5-nitrofurylvinyl)-4-methyl-5-acetylthiazole in a suitable solvent such as a mixture of dioxane or dimethylformamide and water with hydroxylamine, semicarbazide, thiosemicarbazide or an acid addition salt of aminoguanidine. The reaction can be represented by the following chemical equation, using a semicarbazide reactant as an example:

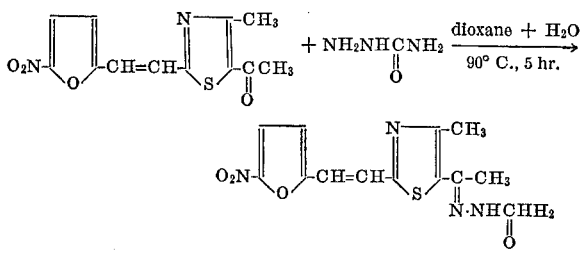

The reaction is conducted at 50–150° C., preferably at 80–100° C. for 1–5 hours. Conventional apparatus is employed. Since the reaction product is only sparingly soluble in the reaction solvent, the reaction product precipitates in the reaction liquid as crystals which may then be collected by filtration and purified by recrystallization from a suitable solvent.

The properties of the compounds of this invention are listed in Table 1 below.

The starting material used in this invention, i.e. 2-(5-nitrofurylvinyl) - 4-methyl-5-acetylthiazole, can be prepared, as

TABLE 1

| Compound number | Chemical formula | Chemical nomenclature | Melting point (°C.) | Appearance |
|---|---|---|---|---|
| 1 | $O_2N-\text{furan}-CH=CH-\text{thiazole(4-CH}_3\text{)}-C(=NOH)-CH_3$ | 2-(5-nitrofurylvinyl)-4-methyl-5-acetylthiazole oxime. | 205 | Pale yellow crystal. |
| 2 | $O_2N-\text{furan}-CH=CH-\text{thiazole(4-CH}_3\text{)}-C(=NOCOCH_3)-CH_3$ | 2-(5-nitrofurylvinyl)-4-methyl-5-acetylthiazole oxime acetate. | 191 | Do. |
| 3 | $O_2N-\text{furan}-CH=CH-\text{thiazole(4-CH}_3\text{)}-C(=N\cdot NHCONH_2)-CH_3$ | 2-(5-nitrofurylvinyl)-4-methyl-5-acetylthiazole semicarbazone. | 255 with decomp. | Reddish orange crystal. |
| 4* | $O_2N-\text{furan}-CH=CH-\text{thiazole(4-CH}_3\text{)}-C(=N\cdot NHCSNH_2)-CH_3$ | 2-(5-nitrofurylvinyl)-4-methyl-5-acetylthiazole thiosemicarbazone. | Higher than 260. | Do. |
| 5* | $O_2N-\text{furan}-CH=CH-\text{thiazole(4-CH}_3\text{)}-C(=NNHC(=NH)NH_2\cdot HCl)-CH_3$ | 2-(5-nitrofurylvinyl)-4-methyl-5-acetylthiazole amidinohydrazone hydrochloride. | Higher than 300. | Reddish brown crystal. |
| 6* | $[O_2N-\text{furan}-CH=CH-\text{thiazole(4-CH}_3\text{)}-C(=NNHC(=NH)NH_2)-CH_3]_2 \cdot H_2SO_4$ | 2-(5-nitrofurylvinyl)-4-methyl-5-acetylthiazole amidinohydrazone sulfate. | ...do... | Do. |

*The compound Nos. 4, 5 and 6 do not show definite melting points but begin to decompose very slowly to carbon at the tabulated temperatures. Purity of the compounds can be determined by alumina T.L.C. and other tests.

represented by the following reaction formula, by heating 5-nitrofurfural or its diacetate and 2,4-dimethyl-5-acetylthiazole in a solvent to produce a condensation reaction.

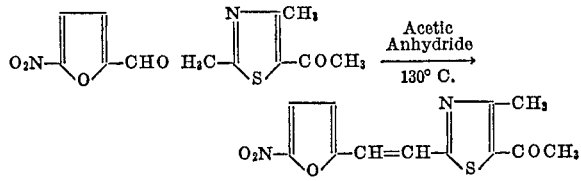

Another compound of this invention, shown as Compound No. 2 in Table 1, i.e. 2-(5-nitrofurylvinyl)-4-methyl-5-acetylthiazole oxime acetate, is prepared by first reacting 2 - (5-nitrofurylvinyl)-4-methyl-5-acetylthiazole with hydroxylamine and then acetylating the resulting 2-(5-nitrofurylvinyl)-4-methyl-5-acetylthiazole oxime. Alternatively, the oxime acetate can easily be prepared by heating 5-nitrofurfural or its diacetate and 2,4-dimethyl-5-acetylthiazole oxime in acetic anhydride. In the alternative method, the condensation reaction between 5-nitrofurfural and 2,4 - dimethyl-5-acetylthiazole oxime takes place simultaneously with acetylation. The end product can thus be obtained in one step using this latter procedure.

The compounds of this invention are derived by reaction with the carbonyl radical (ketone group) of the starting material. Thus, the progress of the reaction itself can be followed by qualitative analysis for ketone groups.

It has been discovered that the compounds of this invention exhibit remarkable growth-inhibiting effect toward various kinds of microorganisms including Gram-positive bacteria, Gram-negative bacteria, fungi and yeasts. The stability of the anti-microbial activity of these compounds is indicated by the fact that the growth-inhibitory effectiveness of these compounds against bacteria when measured in culture media containing mercapto compounds, protein, blood, entrails homogenate, etc. is equal to that measured in a control culture medium free of such deactivating materials. This latter fact indicates that the compounds of this invention would not be deactivated by interaction with biological components in a living body or by the constituents of foodstuffs or animal feeds. A satisfactory preservative effect can be achieved by using a very small amount of the compounds of this invention even in animal feeds containing animal entrails, which in turn contain a high proportion of "deactivating" compounds.

Experiments have demonstrated that the compound of the present invention possesses greater light stability than that of the prior art nitrofuran compounds. For example, if 2 - (5-nitrofuryl-vinyl)-4-methyl-5-acetylthiazole, (the starting material for the present invention) is dissolved in a solvent such as benzene or ethyl acetate and light of 1000 to 5000 lux radiated through the solution thus prepared, the compound will decompose in 5 or 6 hours; in contrast, a compound of the present, e.g. 2-(5-nitrofuryl vinyl)-4-methyl-5-acetylthiazolesemicarbazone maintains its structure for over 30 hours under the same conditions.

A test was conducted to determine the toxicity of the compounds of this invention to warm-blooded animals. Test solutions were prepared for each compound of this invention in polyoxyethylene-sorbitan ester (Tween 80). Each solution was diluted with a physiological salt solution and orally administered to mice in concentrations of 1, 5, 10 and 15 g. (as the compound itself) per kg. (body weight) of the mice. No death resulted during a two week observation period. 15 g./kg. (body weight) is considered to be the upper-limit for the dosages for the test animals, therefore, it was impossible to estimate $LD_{50}$ for the compounds of this invention. When rats and mice were raised on a feed containing 2% of the compound of this invention, no growth-inhibition or pathological or histological abnormality was observed, even after a lapse of 3 months. These test results indicate that the compounds of this invention are suitable for use in preservation of foodstuffs and animal feeds.

The compounds of this invention are also stable against heat, therefore, they may be utilized for the preservation of food-stuffs and animal feeds that require heat treatment. For example, when a compound of this invention is added in an amount of 5–20 p.p.m. to fish meat sausage packed with polyvinylidene chloride film, the safe edibility period was about one month longer than the safe period for a control sample free of the compound of this invention. When added to packed "kamaboko (boiled cake of fish meat paste)," there was no change in appearance or taste in the products after a lapse of 3 weeks from the time of production. Pet foods, composed mainly of animal entrails, bones and the like, and having a high water content, are generally very putrefactive and lose their commercial value within about one week after the time of production. A compound of this invention, in an amount of 5–20 p.p.m., added to a pet food, will assure preservation for a period of at least one month.

The compounds of this invention are also useful as disease preventive agents for fishes and animals. For example, a bath containing a compound of this invention in an amount of 1–5 p.p.m. is effective for treating yellow tails infected with vibrio or eels infected with Aeromonas. A compound of this invention may be added, in an amount of 50–100 p.p.m., to the feed for treating pigs infected with enteritis bivrio.

One or more of the compounds of this invention may be formulated into compositions useful as antimicrobial agents in chemotherapy and in the preservation of foods, drinks, and animal and poultry feeds. Such a composition may be in the form of a solid preparation or a liquid preparation in which the compounds of this invention are dissolved or completely dispersed.

Suitable liquid vehicles for the antimicrobial agents of this invention include harmless solvents such as water, ethanol, ethylene glycol, propylene glycol, diethylene glycol, polyethylene glycol, lanolin and Vaseline. If desired, the compounds of this invention may be dissolved in the liquid vehicle with the aid of a dispersing agent.

If a solid vehicle is to be used, one or more of the compounds of this invention are finely pulverized and then mixed with the solid vehicle such as starch or lactose. A dispersing agent may also be used to ensure a stabilized antimicrobial effect.

The concentration of the antimicrobial agent in the vehicle may be adjusted by the addition of a diluent or filler.

The following examples are intended to be illustrative only, and are not intended to limit the scope of the present invention as defined by the appended claims.

PREPARATION OF 2 - (5 - NITROFURYLVINYL)- 4 - METHYL - 5 - ACETYLTHIAZOLE DERIVATIVES

Example 1: Synthesis of 2-(5-nitrofurylvinyl)-4-methyl-5-acetylthiazole oxime 2.8 g. (0.01 mole) of 2-(5-nitrofurylvinyl)-4-methyl-5-acetylthiazole was dissolved in 50 ml. of dioxane, and to the solution thus prepared were added a solution of 1.4 g. (0.02 mole) of hydroxylamine hydrochloride and then 1.6 g. (0.02 mole) of sodium acetate dissolved together in 10 ml. of water. The resulting solution was heated at 70–80° C. for 5 hours with agitation.

After cooling, the resulting crystalline product was collected by filtration and recrystallized from a mixed solution of dimethylformamide and water. The yield was 2.1 g. of pale yellow crystals, m.p. 205° C.

Elementary analysis as $C_{12}H_{11}N_3O_4S$ (mol. wt. 293)

| | C | H | N |
|---|---|---|---|
| Calculated | 49.14 | 3.75 | 14.33 |
| Found | 49.25 | 3.60 | 14.82 |

Example 2: Synthesis of 2-(5-nitrofurylvinyl)-4-methyl-5-acetylthiazole oxime acetate A mixture of 2.8 g. (0.02 mole) of 5-nitrofurfural, 3.4 g. (0.02 mole) of 2,4-dimethyl-5-acetylthiazole oxime and 30 ml. of acetic anhydride was heated at 120° C. for 8 hours. After cooling, the reaction mixture was poured into about 100 ml. of water. The resulting solid substance was collected by filtration and recrystallized from ethyl acetate. Yield: 4.7 g. of pale yellow crystals having a melting point of 191° C.

Elementary analysis as $C_{14}H_{13}N_3O_5S$ (mol. wt. 335)

| | C | H | N |
|---|---|---|---|
| Calculated | 50.15 | 3.88 | 12.54 |
| Found | 50.10 | 4.01 | 12.33 |

Example 3: Synthesis of 2-(5-nitrofurylvinyl)-4-methyl-5-acetylthiazole semicarbazone 15 g. (0.054 mole) of 2-(5-nitrofurylvinyl)-4-methyl-5-acetylthiazole was dissolved in 300 ml. of dioxane, and then to the solution thus prepared were added a solution of 11 g. (0.1 mole) of semicarbazide hydrochloride and 5.6 g. (0.1 mole) of potassium hydroxide dissolved together in 100 ml. of water. The mixture was heated at 70–80° C. for 2 hours. After cooling, the resulting crystalline product was collected by filtration and purified by recrystallization from dimethylformamide. Yield: 7 g. of reddish brown crystals having a melting point of 255° C. (with decomp.).

Elementary analysis as $C_{13}H_{13}N_5O_4S$ (mol. wt. 335)

| | C | H | N |
|---|---|---|---|
| Calculated | 46.75 | 3.88 | 20.89 |
| Found | 46.41 | 3.90 | 20.60 |

Example 4: Synthesis of 2-(5-nitrofurylvinyl)-4-methyl-5-acetylthiazole thiosemicarbazone 2.8 g. (0.01 mole) of 2-(5-nitrofurylvinyl)-4-methyl-5-acetylthiazole were dissolved in 50 ml. of dioxane and then to the solution thus prepared were added a solution of 1.9 g. (0.015 mole) of thiosemicarbazide hydrochloride and 1.2 g. (0.015 mole) of sodium acetate dissolved together in 10 ml. of water. The mixture was heated at 70–80° C. for 3 hours. After cooling, the resulting crystalline product was collected by filtration and recrystallized from dimethylformamide. Yield: 3.2 g. of reddish orange crystals having a melting point higher than 260° C.

Elementary analysis as $C_{13}H_{13}N_5O_3S_2$ (mol. wt. 351)

| | C | H | N |
|---|---|---|---|
| Calculated | 44.44 | 4.70 | 19.96 |
| Found | 44.63 | 3.55 | 19.53 |

Example 5: Synthesis of 2-(5-nitrofurylvinyl)-4-methyl-5-acetylthiazole amidinohydrazone hydrochloride 25 g. (0.09 mole) of 2-(5-nitrofurylvinyl)-4-methyl-5-acetylthiazole were dissolved, with heating, in 500 ml. of dioxane and then to the solution thus prepared were added 50 ml. of conc. hydrochloric acid and a solution of 16 g. (0.145 mole) of aminoguanidine hydrochloride dissolved in 200 ml. of water. The mixture was heated at 80–100° C. for 2 hours. On cooling, crystals precipitated from the reaction mixture. The product was collected by filtration and recrystallized from propylene glycol. Yield: 19.5 g. of red vermillion crystals having a melting point higher than 300° C.

Elementary analysis as $C_{13}H_{15}N_6O_3SCl$ (mol wt. 370.5)

| | C | H | N |
|---|---|---|---|
| Calculated | 42.10 | 4.04 | 22.67 |
| Found | 41.88 | 4.34 | 22.57 |

Example 6: Synthesis of 2-(5-nitrofurylvinyl)-4-methyl-5-acetylthiazole amidinohydrazone sulfate 2.8 g. (0.01 mole) of 2-(5-nitrofurylvinyl)-4-methyl-5-acetylthiazole were dissolved in 50 ml. of dioxane and then to the solution thus prepared were added 2.5 ml. of conc. sulfuric acid and a solution of 1.0 g. (0.004 mole) of aminoguanidine sulfate in 20 ml. of water. The mixture was heated at 80–100° C. for one hour. After completion of the reaction, the reaction liquid was mixed with decolorizing carbon and filtered. On cooling, crystals precipitated from the filtrate. Yield: 2.6 g. of reddish brown crystals having a melting point higher than 300° C.

Elementary analysis as $C_{26}H_{30}N_{12}O_{10}S_3$ (mol. wt. 766)

| | C | H | N |
|---|---|---|---|
| Calculated | 40.73 | 3.92 | 21.93 |
| Found | 40.70 | 4.05 | 21.72 |

ANTIMICROBIAL ACTIVITY OF 2 - (5 - NITROFURYLVINYL) - 4 - METHYL - 5 - ACETYLTHIAZOLE DERIVATIVES

Example 7: Test for antimicrobial activity in vitro

Determination of antimicrobial activity in vitro was carried out in the following manner:

Each antimicrobial agent was dissolved in a small amount of DMF (N,N-dimethylformamide) and the resulting solution was diluted with water to prepare solutions having different concentrations. Eight strains of bacteria, yeasts and fungi, listed in Table 2, were used as the test microorganisms. The culture media used were a 3% NaCl nutrient broth for the *Vibrio anguillarum*, nutrient broths for the other bacteria and malt extract broths for yeasts and fungi. The pH value of each culture medium was adjusted to 6.5 A diluted solution of each antimicrobial agent was admixed with the above mentioned culture media which were then separately innoculated with a small amount of a cell suspension of one of the test strains. *Vibrio anguillarum*, yeasts and fungi were cultured at 25° C. for 2–5 days and the other bacteria were cultured at 37° C. for 2 days, and the minimal inhibitory concentration (MIC) for each case was determined. The results of the series of tests of example 7 are shown in Table 2 below.

were prepared in this manner, each containing a compound of this invention. A polyvinylidene chloride film casing was charged with a 100–130 g. portion of a sample, sealed and sterilized by heating at 90° C. for 60 min. Preservation was then tested by storing the encased samples in a temperature controlled box conditioned at 35° C., 60% R.H. (relative humidity). The results of the series of tests of Example 8 are shown in Table 3.

TABLE 3

| Days elapsed | 7 | 14 | 21 | 28 | 35 | 42 |
|---|---|---|---|---|---|---|
| Compound added:[1] | | | | | | |
| No. 1 | [2] 25/25 | 25/25 | 25/25 | 25/25 | 25/25 | 25/25 |
| No. 2 | 25/25 | 25/25 | 25/25 | 25/25 | 25/25 | 25/25 |
| No. 3 | 25/25 | 25/25 | 25/25 | 25/25 | 25/25 | 25/25 |
| No. 4 | 25/25 | 25/25 | 25/25 | 25/25 | 25/25 | 25/25 |
| No. 5 | 25/25 | 25/25 | 25/25 | 25/25 | 25/25 | 25/25 |
| No. 6 | 25/25 | 25/25 | 25/25 | 25/25 | 25/25 | 25/25 |
| Nothing added | 25/25 | 15/25 | 9/25 | 0/25 | | |

[1] Compound numbers correspond to those given in Table 1.
[2] Figures represent: "Number of samples remaining in a preserved condition (by appearance)/Total number of samples examined."

NOTE.—pH (1st day of test, i.e. at the start of test) 6.3–6.4.

Example 9: Preservation tests for "kamaboko (boiled cake of fish meat paste)"

To 28.5 kg. of brayed flesh of pollack were added 0.75 kg. of common salt, 1.5 kg. of starch and 2000 p.p.m. potassium sorbate. In a series of tests using the compounds of this invention, a compound of the invention was added to a sample of the above in an amount so that the concentration of the compound was 2.5 p.p.m. of the total amount. Each sample was thoroughly mixed with agitation. A polyvinylidene chloride film casing was applied to a 100–130 g. portion of each sample, sealed and sterilized by heating at 90° C. for 60 minutes. Preservation was then examined by storing each encased sample in a temperature controlled box conditioned at 30° C. 60% R.H. The results of the series of tests of Example 9 are shown in Table 4.

TABLE 4

| Days of preservation | 7 | 14 | 21 | 28 | 35 |
|---|---|---|---|---|---|
| Compound added:[1] | | | | | |
| No. 1 | [2] 25/25 | 25/25 | 25/25 | 25/25 | 25/25 |
| No. 2 | 25/25 | 25/25 | 25/25 | 25/25 | 21/25 |
| No. 3 | 25/25 | 25/25 | 25/25 | 25/25 | 25/25 |
| No. 4 | 25/25 | 25/25 | 25/25 | 25/25 | 25/25 |
| No. 5 | 25/25 | 25/25 | 25/25 | 25/25 | 25/25 |
| No. 6 | 25/25 | 25/25 | 25/25 | 20/25 | 16/25 |
| Nothing added | 10/25 | 0/25 | | | |

[1] Compound numbers correspond to those given in Table 1.
[2] Figures stand for "number of samples remaining in preserved condition (by appearance)/Total number of samples examined."

NOTE.—pH (1st day of test) 6.15–6.25.

TABLE 2

| Compounds | V. a. | E. c. | P. v. | S. a. | B. s. | C. a. | P. c. | C. h. | (MIC μg./ml.) |
|---|---|---|---|---|---|---|---|---|---|
| Table: | | | | | | | | | |
| No. 1 | 1.25 | 0.31 | 2.5 | 0.63 | >0.08 | <200 | <200 | <200 | |
| No. 2 | 0.63 | 0.31 | 5.0 | 0.63 | 0.16 | >12.5 | 200 | >12.5 | |
| No. 3 | 0.63 | 1.25 | 2.5 | 1.25 | >0.08 | <200 | <200 | <200 | |
| No. 4 | 2.5 | 1.25 | 5.0 | 2.5 | >0.08 | <200 | <200 | <200 | |
| No. 5 | 0.63 | 0.63 | 2.5 | 0.63 | 0.16 | 100 | 100 | 25 | |
| No. 6 | 2.5 | 2.5 | 10 | 5.0 | 0.31 | — | — | — | |
| Nitrofurazone* | — | 10 | 50 | 10 | 12.5 | — | — | — | |
| Furazolidone* | — | 0.6 | 30 | 3 | 0.4 | — | — | — | |
| Furylfuramide* | — | 0.6 | 6.25 | 1.56 | 0.1 | — | — | — | |

NOTE.—Symbols: (*)=Referential examples, the values taken from the literature; (—) No data. Abbreviations: V. a.=*Vibrio anguillarum*, E. c.=*Escherichia coli*, P. v.=*Proteus vulgaris*, S. a.=*Staphylococcus aureus* B. a.=*Bacillus subtilis*, C. a.=*Candida albicans*, P. c.=*Penicillium chrysogenum*, C. h.= *Cladosporium herbarum*

Example 8: Preservation tests of fish meat sausage

To brayed flesh composed of 2.5 kg. of whale meat and 1 kg. of pollack meat were added 0.2 kg. of soybean protein, 0.5 kg. of starch, 0.4 kg. of lard, 0.4 kg. of ice water, 0.15 kg. of common salt and potassium sorbate, the amount of potassium sorbate added to the mixture being measured to provide 2000 p.p.m. In a series of tests, a small amount of a compound of this invention was added to a sample of the above mixture to provide a concentration of the compound of 20 p.p.m. Each sample was thoroughly mixed with agitation. Six samples Example 10: Preservation tests for animal feed One kilogram of beef, 1 kg. of pig liver and 1 kg. of pasty chicken born were salted for 2 days using 30 g. of common salt, 0.2 g. of sodium nitrite and 0.3 g. of potassium bromate. The mixture was then minced and brayed. To the brayed flesh was added 2000 p.p.m. potassium sorbate. A series of tests was conducted with samples of the above, each having a compound of this invention added thereto in the amount of 20 p.p.m. Each sample was thoroughly mixed with agitation. A polyvinylidene chloride film casing was applied to a 100–130 g. portion of each mixture, sealed and sterilized by heating at 90° C. for 60 min. Preservation was then examined by storing the casings in a temperature controlled box conditioned at 30° C., 60% R.H. The results of the series of tests of Example 10 are shown in Table 5 below.

TABLE 5

| Days of preservation | 6 | 14 | 21 | 28 | 35 |
|---|---|---|---|---|---|
| Compound added:[1] | | | | | |
| No. 1 | 25/25 | 25/25 | 25/25 | 25/25 | 25/25 |
| No. 2 | 25/25 | 25/25 | 22/25 | 19/25 | 18/25 |
| No. 3 | 25/25 | 25/25 | 25/25 | 25/25 | 25/25 |
| No. 4 | 25/25 | 25/25 | 25/25 | 25/25 | 25/25 |
| No. 5 | 25/25 | 25/25 | 25/25 | 25/25 | 25/25 |
| No. 6 | 25/25 | 25/25 | 25/25 | 19/25 | 25/25 |
| Nothing added | 25/25 | 10/25 | 0/25 | | |

[1] Compound numbers correspond to those given in Table 1.
[2] Figures stand for "Number of samples remaining in a preserved condition (by appearance)/Total number of samples examined."

NOTE.—pH (1st day of test) 6.62, 6.65.

The invention may be embodied in other specific forms without departing from the spirit or essential characteristics thereof. The preferred embodiments, discussed above, are therefore to be considered in all respects as illustrative and not restrictive, the scope of the invention being indicated by the appended claims rather than by the foregoing description.

We claim:
1. A 2 - (5 - nitrofurylvinyl) - 4 - methyl - 5 - substituted thiazole derivative of the formula:

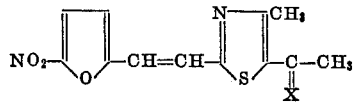

wherein X is a member selected from the group consisting of NOH, N—OCOCH$_3$,

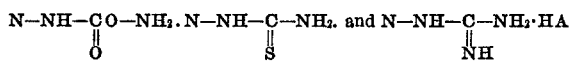

wherein A is an acid anion.

2. 2-(5-nitrofurylvinyl) - 4 - methyl - 5 - acetylthiazole oxime.

3. 2-(5-nitrofurylvinyl) - 4 - methyl - 5 - acetylthiazole oxime acetate.

4. 2-(5-nitrofurylvinyl) - 4 - methyl - 5 - acetylthiazole semicarbazone.

5. 2-(5-nitrofurylvinyl) - 4 - methyl - 4 - acetylthiazole thiosemicarbazone.

6. 2-(5-nitrofurylvinyl) - 4 - methyl - 5 - acetylthiazole amidinohydrazone hydrochloride.

7. 2-(5-nitrofurylvinyl) - 4 - methyl - 5 - acetylthiazole amidinohydrazone sulfate.

References Cited

UNITED STATES PATENTS 3,691,160   9/1972   Roffey et al. _____ 260—240 A

FOREIGN PATENTS 2,162,468   6/1972   Germany _____ 260—240 A

OTHER REFERENCES

Chemical Abstracts, vol. 58, col. 6954a (1963) (abstract of Sych et al., Zhur. Obsch. Khim. vol. 32, pp. 984–90 (1962).

JOHN D. RANDOLPH, Primary Examiner

U.S. Cl. X.R.

426—151; 424—270

UNITED STATES PATENT OFFICE
CERTIFICATE OF CORRECTION

Patent No. 3,822,301                    Dated July 2, 1974

Inventor(s) Saburo Ueno et al.

It is certified that error appears in the above-identified patent and that said Letters Patent are hereby corrected as shown below:

At column 6, line 58, "4.70" should read --3.70--, and "19.96" should read --19.94--.

UNITED STATES PATENT OFFICE
CERTIFICATE OF CORRECTION

Patent No. 3,822,301                           Dated July 2, 1974

Inventor(s) Saburo Ueno et al.

It is certified that error appears in the above-identified patent and that said Letters Patent are hereby corrected as shown below:

The symbols indicating "less than" and "greater than" appearing in Table 2 of column 7 are transposed. Accordingly, Table 2 should read as follows:

Table 2

| Compounds | V.a | E.c | P.v | S.a | B.s | C.a | P.c | C.h | (MIC ug/ml) |
|---|---|---|---|---|---|---|---|---|---|
| Table 1 No.1 | 1.25 | 0.31 | 2.5 | 0.63 | 0.08 | >200 | <200 | <200 | |
| " No.2 | 0.63 | 0.31 | 5.0 | 0.63 | 0.16 | 12.5 | >200 | 12.5> | |
| " No.3 | 0.63 | 1.25 | 2.5 | 1.25 | 0.08 | >200 | <200 | <200 | |
| " No.4 | 2.5 | 1.25 | 5.0 | 2.5 | 0.08 | >200 | <200 | <200 | |
| " No.5 | 0.63 | 0.63 | 2.5 | 0.63 | 0.16 | 100 | 100 | 25 | |
| " No.6 | 2.5 | 2.5 | 10 | 5.0 | 0.31 | - | - | - | |
| Nitrofurazone* | - | 10 | 50 | 10 | 12.5 | - | - | - | |
| Furazolidone* | - | 0.6 | 30 | 3 | 0.4 | - | - | - | |
| Furylfuramide* | - | 0.6 | 6.25 | 1.56 | 0.1 | - | - | - | |

Signed and sealed this 5th day of November 1974.

(SEAL)
Attest:

McCOY M. GIBSON JR.
Attesting Officer

C. MARSHALL DANN
Commissioner of Patents